US011340394B2

United States Patent
Okuda et al.

(10) Patent No.: US 11,340,394 B2
(45) Date of Patent: May 24, 2022

(54) EDGELIT LIGHT GUIDE DEVICE WITH PRISMS FORMING FIRST AND SECOND SUB PATTERNS

(71) Applicant: OMRON Corporation, Kyoto (JP)

(72) Inventors: Mitsuru Okuda, Ichinomiya (JP); Junya Fujita, Ichinomiya (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 17/174,780

(22) Filed: Feb. 12, 2021

(65) Prior Publication Data
US 2021/0286121 A1    Sep. 16, 2021

(30) Foreign Application Priority Data
Mar. 11, 2020    (JP) .............................. JP2020-042366

(51) Int. Cl.
| | |
|---|---|
| *G02B 6/10* | (2006.01) |
| *F21V 8/00* | (2006.01) |
| *A63F 7/00* | (2006.01) |
| *A63F 7/02* | (2006.01) |

(52) U.S. Cl.
CPC .......... *G02B 6/0036* (2013.01); *A63F 7/0058* (2013.01); *A63F 7/02* (2013.01); *G02B 6/0068* (2013.01)

(58) Field of Classification Search
CPC ...... G02B 6/0036; G02B 6/0038; G09F 13/18
See application file for complete search history.

(56) References Cited

U.S. PATENT DOCUMENTS

| | | | | | |
|---|---|---|---|---|---|
| 2,223,409 | A | * | 12/1940 | Dixon | G02B 6/0091 40/546 |
| 4,244,130 | A | * | 1/1981 | Frois | G02B 6/0076 40/442 |
| 4,715,137 | A | * | 12/1987 | Scheve | G02B 6/0043 40/542 |
| 5,177,889 | A | * | 1/1993 | Ching Hwei | B60Q 1/56 40/204 |
| 5,390,436 | A | * | 2/1995 | Ashall | G02B 6/0043 40/546 |
| 6,217,186 | B1 | * | 4/2001 | Fisher | G02B 6/0061 362/627 |
| 6,539,656 | B2 | * | 4/2003 | Maas | G02B 6/0036 40/546 |
| 7,226,196 | B2 | * | 6/2007 | Parker | G02B 6/0018 362/606 |

(Continued)

FOREIGN PATENT DOCUMENTS

JP    2017-107048 A    6/2017

*Primary Examiner* — Ismael Negron
(74) *Attorney, Agent, or Firm* — Metrolex IP Law Group, PLLC (57) ABSTRACT

A display includes a light guide plate having an incident edge surface and an output surface; a plurality of light sources arranged opposed to the incident edge surface; and a plurality of prisms arranged in a main pattern on a surface, each prism having a reflective surface configured to reflect light from any of the plurality of light sources towards the output surface. A curvature of the reflective surface of a first prism arranged in a first sub-pattern of the main pattern, is different from a curvature of the reflective surface of a second prism arranged in a second sub-pattern of the main pattern.

2 Claims, 8 Drawing Sheets

(56) References Cited

U.S. PATENT DOCUMENTS

| | | | | |
|---|---|---|---|---|
| 7,810,982 B2 * | 10/2010 | Parker | ............ | F21V 11/00 |
| | | | | 362/620 |
| 8,764,266 B2 * | 7/2014 | Urtiga | ............ | G09F 13/18 |
| | | | | 362/616 |
| 9,903,996 B2 * | 2/2018 | Fukui | ............ | G09F 13/14 |
| 10,690,830 B2 * | 6/2020 | Takagi | ............ | G02B 6/0036 |
| 2018/0182201 A1 | 6/2018 | Fujita et al. | | |
| 2020/0074895 A1 * | 3/2020 | Liang | ............ | G02B 6/0076 |

* cited by examiner

EDGELIT LIGHT GUIDE DEVICE WITH PRISMS FORMING FIRST AND SECOND SUB PATTERNS

CROSS-REFERENCE TO RELATED APPLICATION

This application is based on Japanese Patent Application No. 2020-042366 filed with the Japan Patent Office on Mar. 11, 2020, the entire contents of which are incorporated herein by reference.

FIELD

The disclosure relates to a display device capable of displaying a pattern by using a light guide plate, and a game machine having such a display device.

BACKGROUND

A technique has been proposed that enables dynamic switching of a displayed pattern according to a light source to be turned on among a plurality of light sources (see, for example, JP 2017-107048 A).

For example, a display device disclosed in JP 2017-107048 A includes: a light guide plate capable of displaying a plurality of patterns; a plurality of light sources arranged and disposed along one side of a side wall of the light guide plate; and a control part for controlling lighting and lights-out of the plurality of light sources according to lighting order information. The light guide plate has a plurality of prisms that are arranged for every pattern along the pattern, on a surface on one side of the light guide plate, and reflect visible light which enters the light guide plate from an incidence plane of the light guide plate and is emitted from, among the plurality of light sources, a light source corresponding to the pattern toward the other surface of the light guide plate.

However, in the technique described above, it is not expected to give a sense of depth to the displayed pattern.

SUMMARY

A display device according to one or more embodiments may be capable of giving a sense of depth to a displayed pattern.

A display device according to one or more embodiments may be formed in a sheet shape with a transparent member, and may be capable of displaying at least one pattern. The display device according to one or more embodiments may include: a light guide plate having an incident surface formed on one of side surfaces; and a plurality of light sources opposed to the incident surface of the light guide plate and arranged along a longitudinal direction of the incident surface. The light guide plate has, on a surface on one side, a plurality of prisms arranged in at least one pattern and having a reflective surface configured to reflect light emitted from any of the plurality of light sources and incident into the light guide plate from the incident surface, to be emitted from an outgoing surface on another side of the light guide plate. The plurality of prisms may be formed with a mutual difference between a first curvature of the surface on one side of the light guide plate and of the reflective surface of a first prism arranged in a first sub-pattern included in the at least one pattern among the plurality of prisms, and a second curvature of the surface on one side of the light guide plate and of a second prism arranged in a second sub-pattern that is included in the at least one pattern and may be different from the first sub-pattern, among the plurality of prisms.

Having such a configuration may allow a display device to give a sense of depth to the displayed pattern.

In the display device, the reflective surface of the first prism arranged in the first sub-pattern may preferably be formed so as to have a planar shape along a surface on one side of the light guide plate. The reflective surface of the second prism arranged in the second sub-pattern may preferably be formed so as to have a curved surface shape that is convex with respect to the incident surface along the surface on one side of the light guide plate.

The above described configuration may allow the display device to make the first sub-pattern look sharper than the second sub-pattern, enabling the sense of depth of the displayed pattern to be further emphasized.

In the above described configuration, it may be more preferable that a first light source and a second light source among the plurality of light sources emit light having mutually different colors. Further, the first prism may be more preferable arranged so that the reflective surface of the first prism faces the first light source, and the reflective surface of the second prism is more preferable arranged so as to reflect light from each of the first light source and the second light source toward the same direction on another surface side of the light guide plate.

The above described configuration may allow the display device to show the first sub-pattern to shine with the color of the light from the first light source, and show the second sub-pattern to shine with an additively mixed color of the color of the light from the first light source and the color of the light from the second light source, enabling the sense of depth of the displayed pattern to be emphasized.

Further, a game machine according to one or more embodiments may include: a game machine main body; and a display device provided on a surface on a side opposed to a player, on the game machine main body. In the above described game machine, the display device may be formed in a sheet shape with a transparent member, and may be capable of displaying at least one pattern. The display device may include: a light guide plate having an incident surface formed on one of side surfaces; and a plurality of light sources opposed to the incident surface of the light guide plate and arranged along a longitudinal direction of the incident surface. The light guide plate may have, on a surface on one side, a plurality of prisms arranged in at least one pattern and having a reflective surface configured to reflect light emitted from any of the plurality of light sources and incident into the light guide plate from the incident surface, to be emitted from an outgoing surface on another side of the light guide plate. The plurality of prisms may be formed with a mutual difference between a first curvature of the surface on one side of the light guide plate and of the reflective surface of a first prism arranged in a first sub-pattern included in the at least one pattern among the plurality of prisms, and a second curvature of the surface on one side of the light guide plate and of a second prism arranged in a second sub-pattern that is included in the at least one pattern and is different from the first sub-pattern, among the plurality of prisms.

Having such a configuration may allow a game machine to give a sense of depth to the displayed pattern.

DETAILED DESCRIPTION

Hereinafter, a display device according to one or more embodiments are described with reference to the drawings. An exemplary display device may have a light guide plate obtained by forming, in a sheet shape, a material transparent to light emitted by a plurality of light sources. A surface on one side of the light guide plate is formed as an outgoing surface facing an observer. Further, any of peripheral side surfaces surrounding the outgoing surface of the light guide plate is formed as an incident surface opposed to the plurality of light sources. On another surface (hereinafter referred to as a back surface) of the light guide plate opposed to the outgoing surface, there are formed a plurality of prisms configured to reflect light emitted from any of the plurality of light sources and incident into the light guide plate, toward the outgoing surface. Each of the plurality of prisms is arranged in at least one pattern displayed by the display device. In the display device, a curvature of the back surface of the light guide plate and of the first prism arranged in a first sub-pattern included in the pattern is made different from a curvature of the back surface of the light guide plate and of the second prism arranged in a second sub-pattern included in the pattern. As a result, when the observer sees the pattern from a predetermined viewpoint on a surface side opposite to the back surface of the light guide plate (hereinafter, a surface opposed to the observer is referred to as a front surface), the number of light sources having light reflected by the first prism and directed toward the predetermined viewpoint among the plurality of light sources is to be different from the number of light sources having light reflected by the second prism and directed toward the predetermined viewpoint among the plurality of light sources. As a sub-pattern includes a prism with a greater number of light sources having light directed toward the predetermined viewpoint, light from a wider range reaches the predetermined viewpoint. Therefore, the observer sees the sub-pattern as blurred. Furthermore, since the curvature of the first prism and the curvature of the second prism are mutually different, a position of an image of each light source seen from the predetermined viewpoint through the first prism is to be different from a position of an image of each light source seen from the predetermined viewpoint through the second prism. Therefore, the observer sees a different degree of blurring between the first sub-pattern and the second sub-pattern, which accordingly generates a sense of depth in the pattern.

Figure 1:
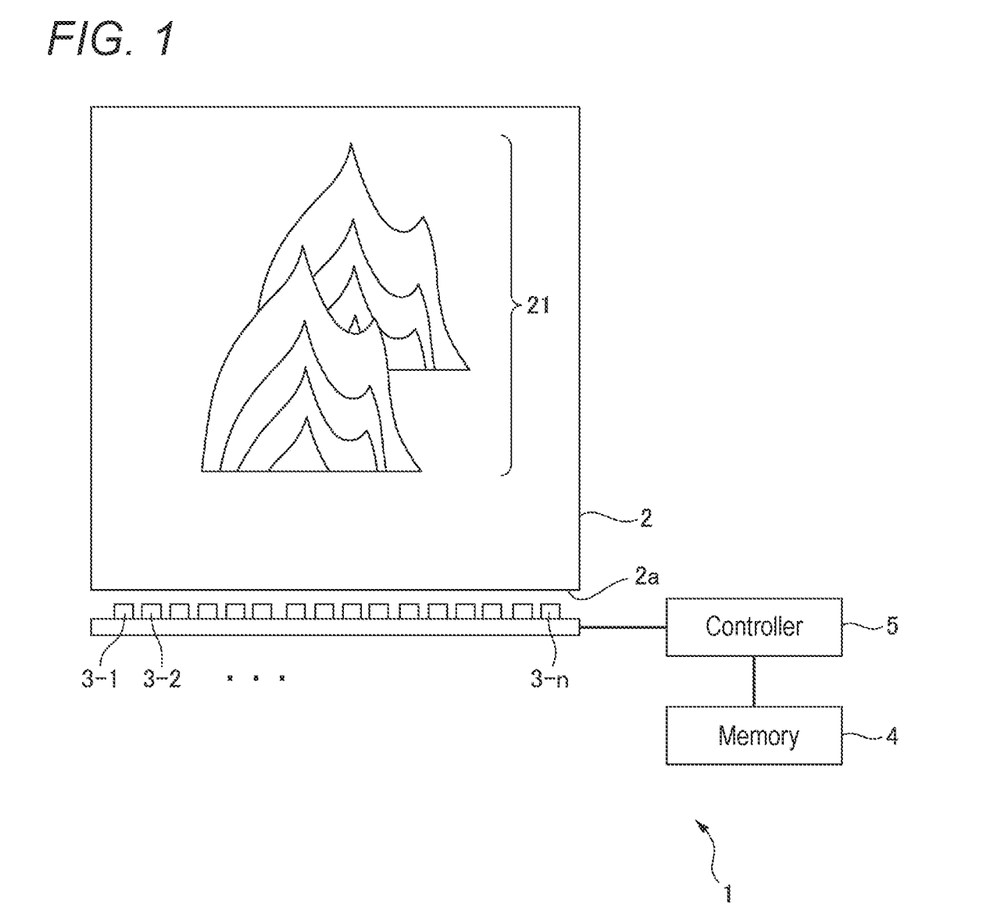
FIG. 1 is a schematic diagram illustrating a configuration of a display device according to one or more embodiments.

FIG. 1 is a schematic diagram illustrating a configuration of the display device according to one or more embodiments. A display device 1 includes a light guide plate 2, a plurality of light sources 3-1 to 3-$n$ ($n$ is an integer of 2 or more), a memory 4, and a controller 5.

The light guide plate 2 is a member formed in a sheet shape and transparent to light emitted from the light sources 3-1 to 3-$n$. The light guide plate 2 is formed by molding resin that is transparent to visible light, such as, for example, polymethylmethacrylate (PMMA), polycarbonate, or cycloolefin polymer. The light guide plate 2 is provided with a pattern 21 that can be displayed by turning on the light sources 3-1 to 3-$n$. However, the number of displayable patterns provided on the light guide plate 2 is not limited to one, and a pattern design is not limited to the example shown in FIG. 1. The light guide plate 2 propagates light from the light sources 3-1 to 3-$n$ inside the light guide plate 2 while the light sources 3-1 to 3-$n$ are lit, and reflects the light toward the observer positioned on the front surface side of the light guide plate 2, with a plurality of prisms (details will be described later) formed on the back surface side and arranged to form the pattern 21. Propagation of light as described above, allows the observer to visually recognize the light emitting pattern 21. Details of the light guide plate 2 will be described later.

Each of the plurality of light sources 3-1 to 3-$n$ has at least one light emitting element configured to emit visible light. In the present embodiment, the light sources 3-1 to 3-$n$ are individually arranged in a line and at equal intervals along a longitudinal direction of an incident surface 2$a$, which is one of side surfaces of the light guide plate 2. A distance between two adjacent light source among the light sources 3-1 to 3-$n$ may be different for each pair of the two light sources.

The light sources 3-1 to 3-$n$ are individually turned on or off in accordance with a control signal from the controller 5. While the controller 5 turns on the light sources 3-1 to 3-$n$, light emitted from the light sources 3-1 to 3-$n$ is incident into the light guide plate 2 via the incident surface 2$a$. The incident light propagates through the light guide plate 2 while being totally reflected, and is reflected by the plurality of prisms provided on the back surface of the light guide plate 2 and forming the pattern 21, and is emitted from the outgoing surface on the front surface side.

The light emitting element of the light sources 3-1 to 3-$n$ is, for example, a light emitting diode. Emission colors of the individual light sources may be the same or mutually different.

The memory 4 has, for example, a volatile or non-volatile memory circuit. The memory 4 stores a lighting order of the light sources 3-1 to 3-*n*, that is, lighting control information indicating a timing of turning on and turning off the light sources.

For example, the controller 5 has a processor and a drive circuit configured to drive the light sources 3-1 to 3-*n*. The controller 5 controls turning on and turning off of the light sources 3-1 to 3-*n* in accordance with the lighting control information.

For example, on the front surface side of the light guide plate 2, for making the pattern 21 visible to the observer positioned on the outgoing surface side of the light guide plate 2, the controller 5 turns on the light sources 3-1 to 3-*n*. Whereas, for making the pattern 21 invisible to the observer, the controller 5 turns off the light sources 3-1 to 3-*n*. Further, the controller 5 may turn on some light sources among the light sources 3-1 to 3-*n* and turn off other light sources, to allow a part of the pattern 21 alone to be visible to the observer. Further, in order to dynamically change a part of the pattern 21 that is visually recognizable to the observer, the controller 5 may sequentially change a combination of the light sources to be turned on among the light sources 3-1 to 3-*n*, in accordance with the lighting control information. Note that, for making the pattern 21 always visually recognizable, the controller 5 may always turn on each light source while the display device 1 is operating, without referring to the lighting control information.

Details of the light guide plate 2 will be described below.

Figure 2:
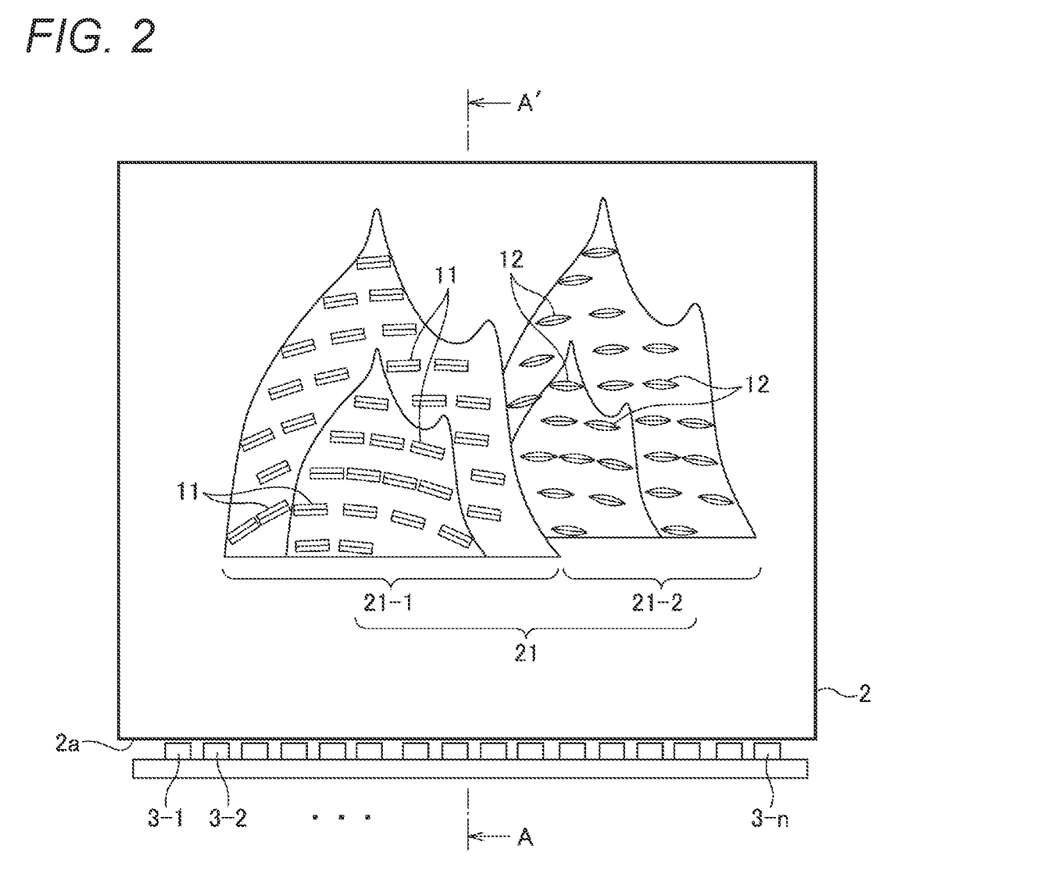
FIG. 2 is a schematic diagram illustrating a front view of a light guide plate included in a display device.
Figure 3:
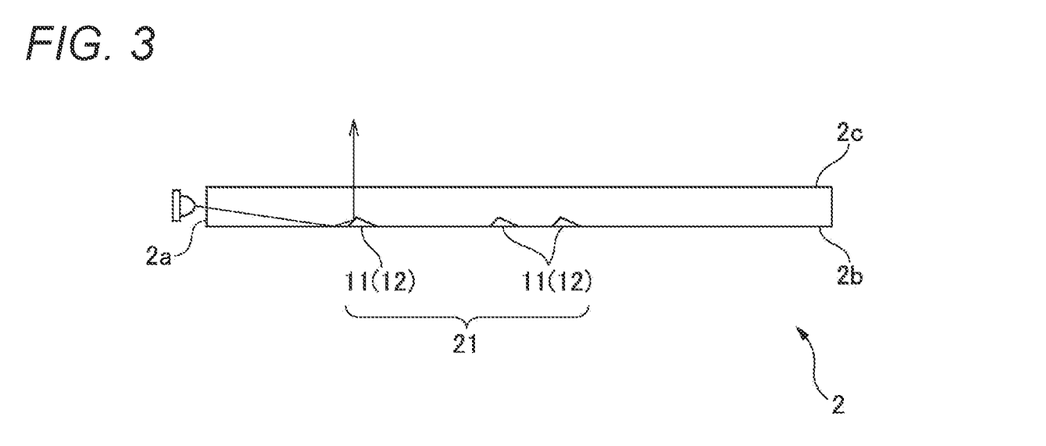
FIG. 3 is a schematic diagram illustrating a side cross-sectional view of a light guide plate taken along a section line indicated by arrows A and A' in FIG. 2.

FIG. 2 is a schematic front view of the light guide plate 2. Further, FIG. 3 is a schematic side cross-sectional view of the light guide plate 2 taken along a section line indicated by arrows A and A' in FIG. 2. As shown in FIGS. 2 and 3, one of side surfaces of the light guide plate 2 is formed as the incident surface 2a opposed to the light sources 3-1 to 3-*n*. As described above, light emitted from the light sources 3-1 to 3-*n* is incident into the light guide plate 2 from the incident surface 2a. The light emitted from the light sources 3-1 to 3-*n* and having propagated inside the light guide plate 2 is totally reflected by each of the plurality of prisms formed on a back surface 2b of the light guide plate 2 and arranged in the pattern 21, and emitted from an outgoing surface 2c located on the front surface side of the light guide plate 2 and opposed to the back surface 2b.

In the present embodiment, the pattern 21 includes a first sub-pattern 21-1 and a second sub-pattern 21-2. The sub-patterns included in the pattern 21 may be provided to be adjacent to each other or may be provided to be separated from each other. Further, shapes and sizes of the sub-patterns may be the same as each other or may be different from each other.

Moreover, in the present embodiment, in the first sub-pattern 21-1, a plurality of prisms 11 are arranged, for example, in a grid shape, a line shape, or a staggered shape so as to form the first sub-pattern 21-1. Whereas, in the second sub-pattern 21-2, a plurality of prisms 12 are arranged, for example, in a grid shape, a line shape, or a staggered shape so as to form the second sub-pattern 21-2. Note that each of the plurality of prisms 11 is an example of a first prism, and each of the plurality of prisms 12 is an example of a second prism. Therefore, the observer can observe the pattern 21 including the first sub-pattern 21-1 and the second sub-pattern 21-2 that appear to emit light while the light sources 3-1 to 3-*n* are turned on. It should be noted that, in FIGS. 2 and 3, a size of each prism and a thickness of the light guide plate 2 are exaggerated in order to improve the visibility of the figure.

Figure 4A:
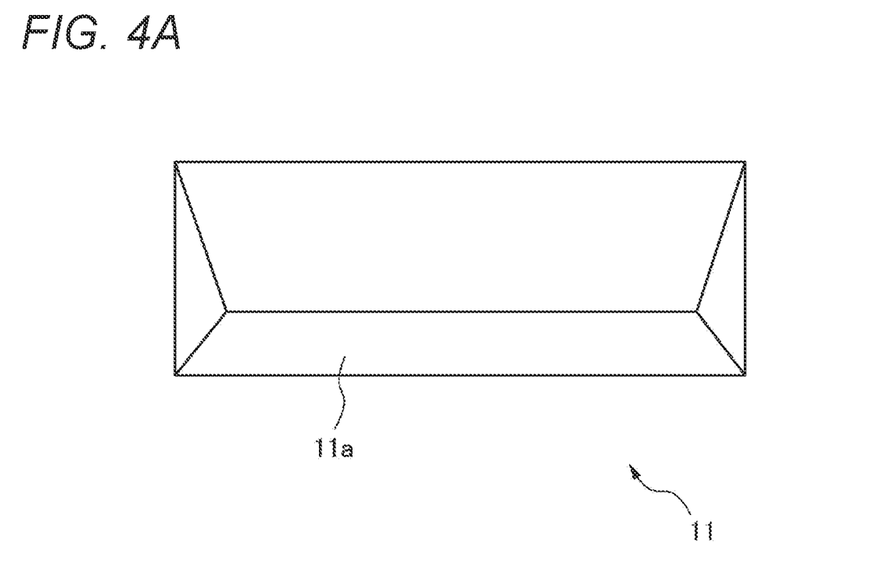
FIG. 4A is a schematic diagram illustrating a front view of a prism arranged in a first sub-pattern.
Figure 4B:
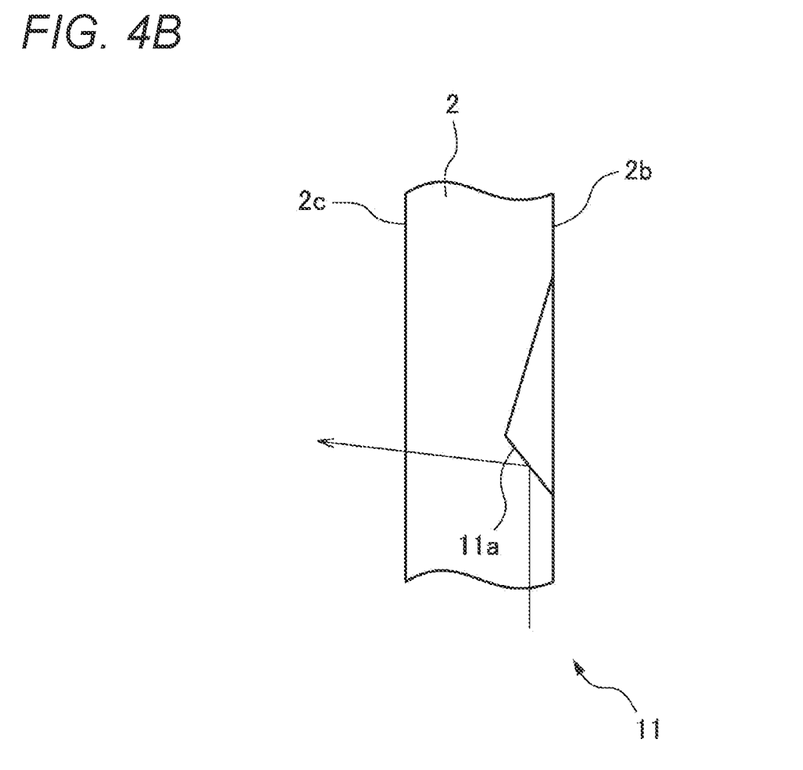
FIG. 4B is a schematic diagram illustrating a side view of a prism, such as is illustrated in FIG. 4A.

FIG. 4A is a schematic front view of the prism 11 arranged in the first sub-pattern 21-1, and FIG. 4B is a schematic side view of the prism 11. The prism 11 is formed as a triangular prismatic groove having a predetermined length on the back surface 2b of the light guide plate. One of two slopes of the prism 11 is formed as a reflective surface 11a configured to reflect light from the light sources 3-1 to 3-*n* toward the outgoing surface 2c. For example, the reflective surface 11a is provided so as to form an angle of, for example, 40° to 50° with respect to the back surface 2b, for totally reflecting and directing light that is from any of the light sources 3-1 to 3-*n* and incident into the light guide plate 2, toward the outgoing surface 2c. Further, the reflective surface 11a is directed so as to face any of the light sources 3-1 to 3-*n*, for example. Moreover, the predetermined length is set to a length that enables the plurality of prisms 11 to be arranged in the first sub-pattern 21-1, for example, about 100 µm to several mm.

In the present embodiment, the reflective surface 11a of the prism 11 is formed in a planar shape. That is, a curvature of the reflective surface 11a of the back surface 2b is 0 (that is, a radius of curvature is ∞). Therefore, light emitted from each of the light sources 3-1 to 3-*n* and incident into the light guide plate 2 is reflected by the reflective surface 11a in mutually different directions. Accordingly, the observer positioned on the front surface side of the light guide plate 2 sees any one of the light sources 3-1 to 3-*n* through the prism 11. Therefore, to the observer, the first sub-pattern 21-1 looks sharp.

Figure 5A:
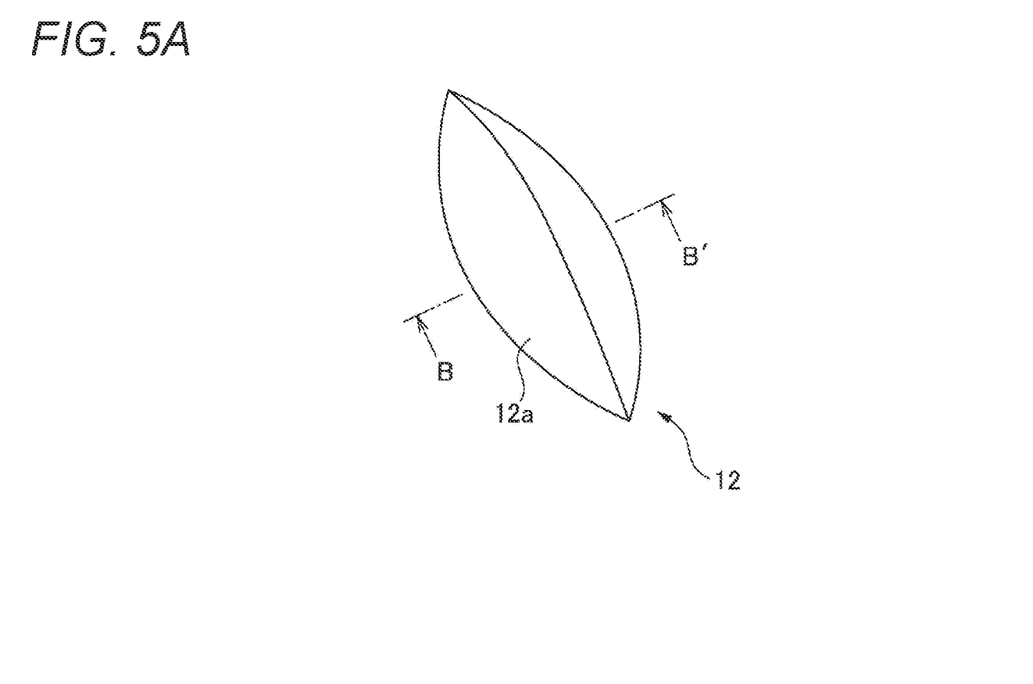
FIG. 5A is a schematic diagram illustrating a perspective view of a prism arranged in a second sub-pattern.
Figure 5B:
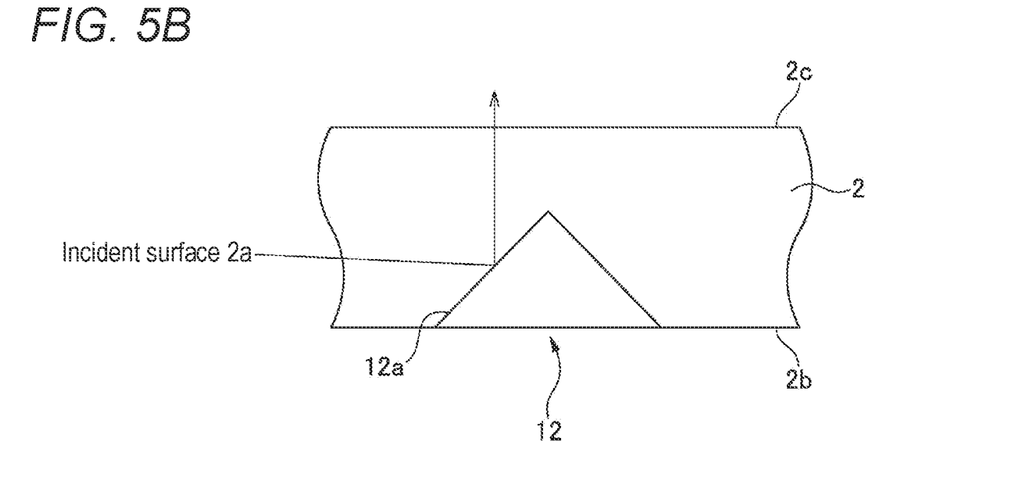
FIG. 5B is a schematic diagram illustrating a side cross-sectional view of a prism taken along a section line indicated by arrows B and B' in FIG. 5A.

FIG. 5A is a schematic perspective view of the prism 12 arranged in the second sub-pattern 21-2, and FIG. 5B is a schematic side cross-sectional view of the prism 12 taken along a line indicated by arrows B and B' in FIG. 5A. The prism 12 is formed as a groove having a predetermined length on the back surface 2b of the light guide plate, having a wide center, and narrowing as approaching an end. One of two slopes of the prism 12 is formed as a reflective surface 12a configured to reflect light from the light sources 3-1 to 3-*n* toward the outgoing surface 2c. Further, the prism 12 is formed so that a cross-sectional shape in a surface orthogonal to the back surface 2b and the reflective surface 12a is substantially triangular, similarly to the prism 11. For example, the reflective surface 12a is provided so as to form an angle of, for example, 40° to 50° with respect to the back surface 2b, for totally reflecting and directing light that is from the light sources 3-1 to 3-*n* and incident into the light guide plate 2, toward the outgoing surface 2c. Further, the prism 12 is arranged so that the reflective surface 12a is directed toward the light source 3-1 to 3-*n* side. Moreover, the predetermined length is set to a length that enables the plurality of prisms 12 to be arranged in the second sub-pattern 21-2, for example, about 100 µm to several mm.

In the present embodiment, a shape of the reflective surface 12a of the prism 12 is formed to be a curved surface shape (for example, a cylindrical shape, a spherical shape, or a paraboloidal shape) that is convex with respect to the incident surface 2a. That is, a shape of the reflective surface 12a along the back surface 2b becomes a curved shape (for example, an arc shape or a parabolic shape) that is convex with respect to the incident surface 2a. Further, a curvature (a curvature at an apex of the reflective surface 12a, when the reflective surface 12a is formed in a paraboloidal shape) is a positive value (that is, a radius of curvature is a positive finite value). Therefore, the reflective surface 12a can reflect light emitted from two or more light sources among the light sources 3-1 to 3-*n* and incident into the light guide plate 2, to be emitted toward the front surface side of the light guide plate 2 through the outgoing surface 2c. Accordingly, the observer positioned on the front surface side of the light guide plate 2 sees two or more of the light sources 3-1 to 3-*n* through the prism 12. Consequently, the observer sees a greater number of light sources visible through prism 12 than the number of light sources visible through prism 11, that is, sees the light shining over a wider range through the prism 12 than through the prism 11. Therefore, the second sub-pattern 21-2 looks blurrier than the first sub-pattern 21-1.

Figure 6:
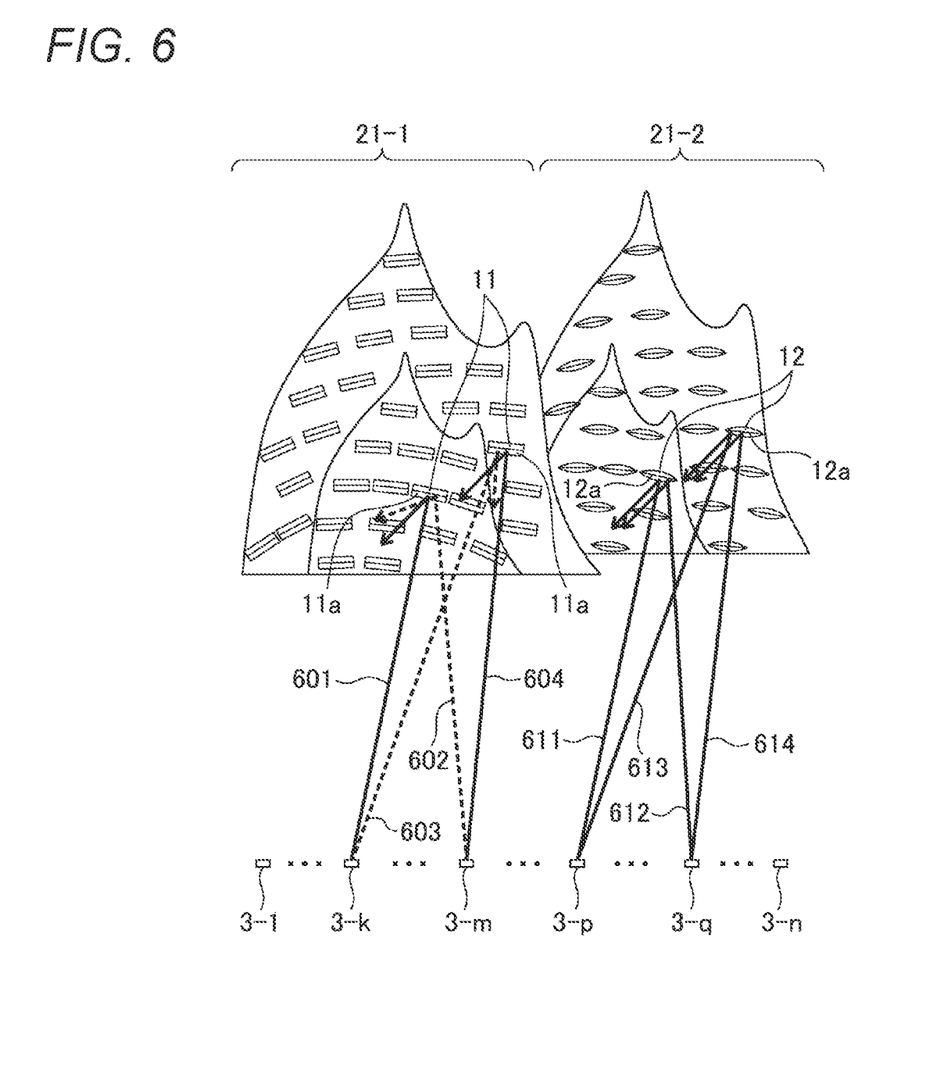
FIG. 6 is a schematic diagram illustrating a view for explaining a difference between a reflection direction of light from each light source by a prism forming a first sub-pattern, and a reflection direction of light from each light source by a prism forming a second sub-pattern.

FIG. 6 is a schematic view for explaining a difference between a reflection direction of light from each light source by the prism 11 and a reflection direction of light from each light source by the prism 12. As indicated by arrows 601 to 604, light from mutually different light sources among the light sources 3-1 to 3-n (for example, a light source 3-k and a light source 3-m) is incident at mutually different angles with respect to a normal direction of the reflective surface 11a of the prism 11 arranged so as to form the first sub-pattern 21-1, causing the light from mutually different light sources to be reflected by the prism 11 in mutually different directions. Therefore, light from any one light source alone among the light sources 3-1 to 3-n reaches a predetermined viewpoint on the front surface side of the light guide plate 2 by the prism 11.

Whereas, the reflective surface 12a of the prism 12 arranged to form the second sub-pattern 21-2 is formed in a curved surface shape that is convex with respect to the incident surface 2a, along the back surface 2b. Therefore, a position of any of the reflective surfaces 12a faces two or more light sources among the light sources 3-1 to 3-n (for example, a light source 3-p and a light source 3-q). Accordingly, as indicated by arrows 611 to 614, light from two or more light sources among the light sources 3-1 to 3-n is incident perpendicularly to the reflective surface 12a of the prism 12 arranged to form the second sub-pattern 21-2. Therefore, light from these two or more light sources is reflected by the prism 12 toward the same direction on the outgoing surface 2c side, and light from two or more light sources among the light sources 3-1 to 3-n reaches the predetermined viewpoint on the front surface side of the light guide plate 2 by the prism 12.

Further, the reflective surface 11a of the prism 11 functions as a plane mirror with respect to the light sources 3-1 to 3-n, while the reflective surface 12a of the prism 12 functions as a convex mirror with respect to the light sources 3-1 to 3-n. Therefore, for the observer positioned on the front surface side of the light guide plate 2, a position of an image of the light sources 3-1 to 3-n seen through the prism 11 in a depth direction (that is, a normal direction of the outgoing surface 2c of the light guide plate 2) is different from a position of an image of the light sources 3-1 to 3-n seen through the prism 12 in the depth direction. Accordingly, in the depth direction, a position of the first sub-pattern 21-1 formed by the prism 11 appears to be different from a position of the second sub-pattern 21-2 formed by the prism 12.

Since a degree of blurring and a visible position are different for each sub-pattern included in the pattern 21, the display device 1 can display the pattern 21 such that the pattern 21 has a sense of depth.

Note that the shape of the prism 12 is not limited to the shape shown in FIGS. 5A and 5B.

Figure 7A:
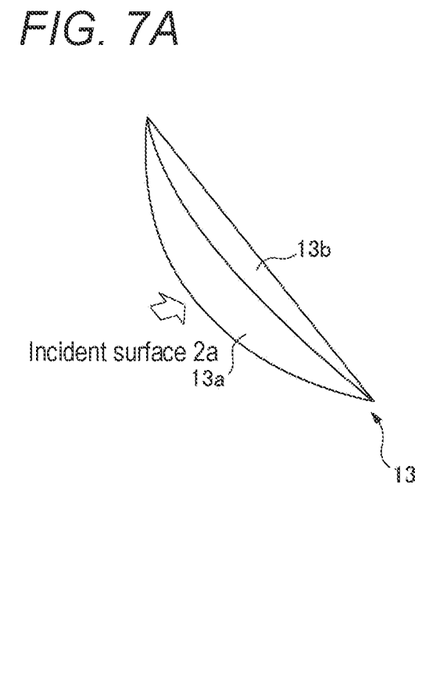
FIGS. 7A and 7B are schematic diagrams illustrating a perspective view and a cross-sectional view showing a shape of a prism according to one modification.
Figure 7B:
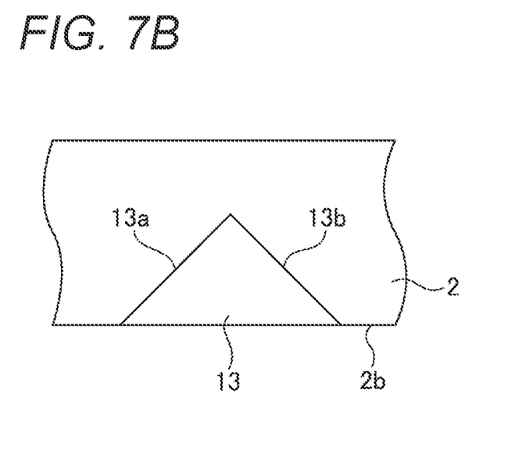
Figure 7C:
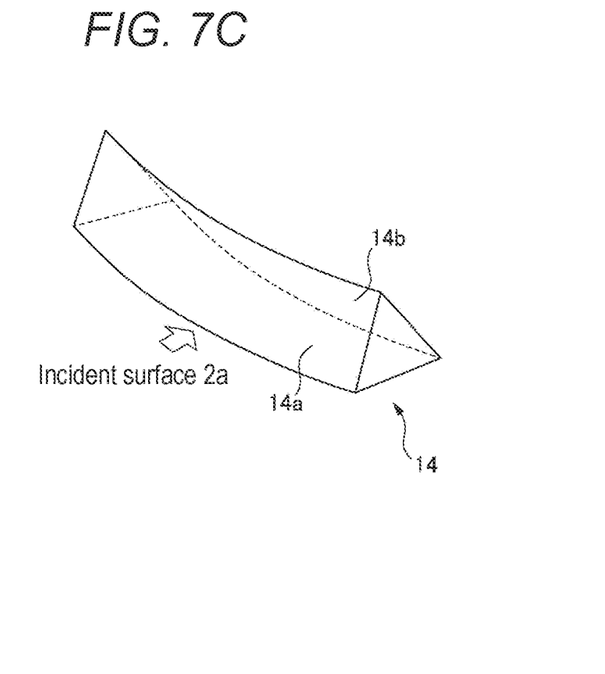
FIGS. 7C and 7D are schematic diagrams illustrating a perspective view and a cross-sectional view showing a shape of a prism according to another modification.
Figure 7D:
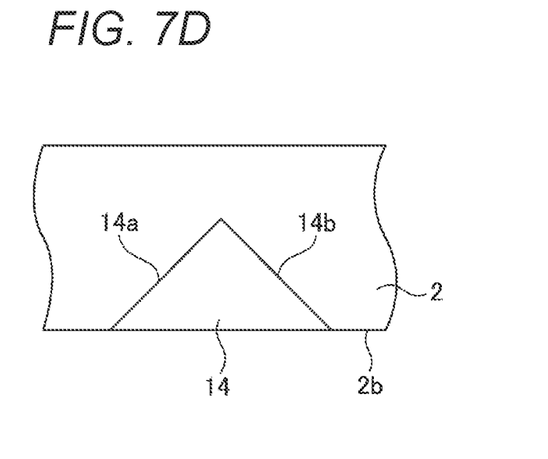

FIGS. 7A and 7B are a schematic perspective view and a schematic cross-sectional view showing a shape of a prism according to one modification. Further, FIGS. 7C and 7D are a schematic perspective view and a schematic cross-sectional view showing a shape of a prism according to another modification.

Similarly to the prism 12, a prism 13 shown in FIGS. 7A and 7B is also formed such that a reflective surface 13a, which is a slope on a side opposed to the light sources 3-1 to 3-n, has a curved surface shape that is convex with respect to the incident surface 2a, along the back surface 2b of the light guide plate 2. Whereas, the prism 13 is different from the prism 12 in that a slope 13b being not opposed to the light sources 3-1 to 3-n is formed in a planar shape. Further, similarly to the prism 12, a prism 14 shown in FIGS. 7C and 7D is also formed such that a reflective surface 14a, which is a slope on a side opposed to the light sources 3-1 to 3-n, has a curved surface shape that is convex with respect to the incident surface 2a, along the back surface 2b. Whereas, the prism 14 is different from the prism 12 in that a slope 14b being not opposed to the light sources 3-1 to 3-n is formed along the back surface 2b to be concentric with the reflective surface 14a. The prism 13 and the prism 14 are, similarly to the prism 12, formed such that a cross-sectional shape of a reflective surface in a surface orthogonal to the back surface 2b and the reflective surface has a planar shape.

Also in the prisms according to these modifications, a shape of the reflective surface along the back surface 2b of the light guide plate 2 is a curved surface shape that is convex with respect to the incident surface 2a of the light guide plate 2, that is, with respect to the light sources 3-1 to 3-n. Therefore, the prism 13 and the prism 14 according to these modifications can also produce functions and effects similar to those of the prism 12.

Figure 8A:
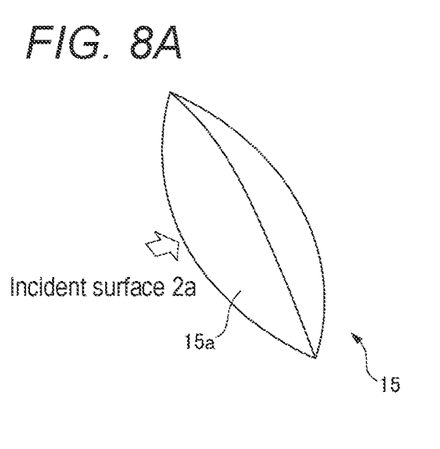
FIGS. 8A and 8B are schematic diagrams illustrating a perspective view and a cross-sectional view showing a shape of a prism according to still another modification.
Figure 8B:
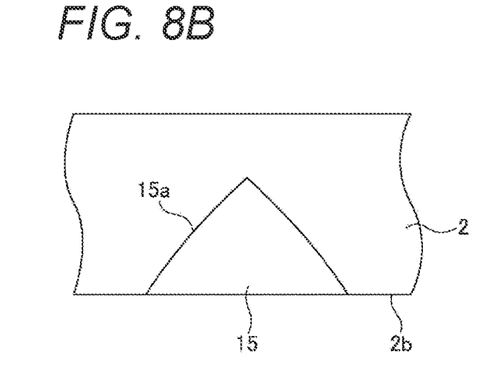
Figure 8C:
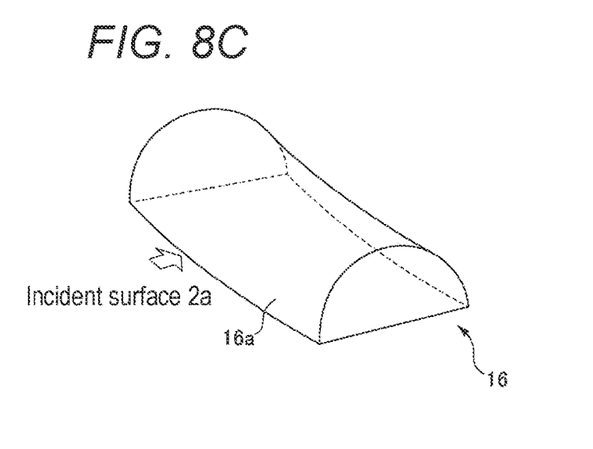
FIGS. 8C and 8D are a schematic perspective view and a schematic cross-sectional view showing a shape of a prism according to yet another modification.
Figure 8D:
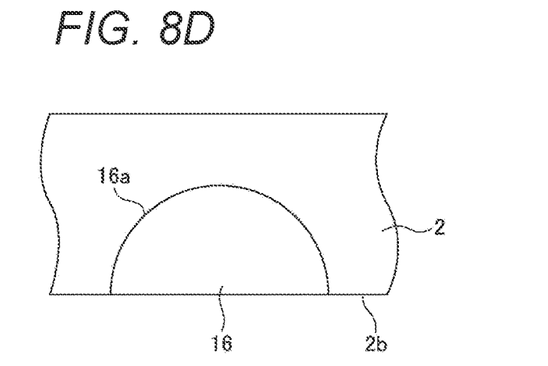

FIGS. 8A and 8B are a schematic perspective view and a schematic cross-sectional view showing a shape of a prism according to still another modification. Further, FIGS. 8C and 8D are a schematic perspective view and a schematic cross-sectional view showing a shape of a prism according to yet another modification.

Similarly to the prism 12, a prism 15 shown in FIGS. 8A and 8B is also formed such that a reflective surface 15a, which is a slope on a side opposed to the light sources 3-1 to 3-n, has a curved surface shape that is convex with respect to the incident surface 2a, along the back surface 2b of the light guide plate 2. Further, the reflective surface 15a is formed so as to have a curved surface shape that is convex with respect to the incident surface 2a, also in a cross-sectional direction orthogonal to the back surface 2b and the reflective surface 15a. Similarly, the prism 16 shown in FIGS. 8C and 8D is also formed such that, similarly to the prism 12, a reflective surface 16a, which is a slope on a side opposed to the light sources 3-1 to 3-n, has a curved surface shape that is convex with respect to the incident surface 2a, along the back surface 2b of the light guide plate 2. Further, the reflective surface 16a is formed so as to have a curved surface shape that is convex with respect to the incident surface 2a, also in the cross-sectional direction orthogonal to the back surface 2b and the reflective surface 16a. Note that the prism 16 is formed so that a cross-sectional shape in the cross-sectional direction is a semicircular shape. Similarly to the prism 12, the prisms according to the modifications can make light from two or more of the light sources 3-1 to 3-n visible to the observer positioned on the front surface side of the light guide plate 2, to cause the sub-pattern formed by these prisms to look blurred. Further, the prisms according to the modifications spread light from the light sources 3-1 to 3-n also along a line connecting each of the light sources 3-1 to 3-n and the reflective surface. Therefore, the prisms according to the modification can make the sub-pattern look more blurred.

As described above, the light guide plate of the display device has the plurality of prisms arranged so as to form the sub-pattern for each sub-pattern included in the displayed pattern, and the pattern is displayed by those prisms reflecting, toward the front surface side, light that is emitted from each light source and incident into the light guide plate. In the display device, each prism is formed so that the curvature of the reflective surface of the prism forming the sub-pattern along the back surface of the light guide plate is different from one another for each sub-pattern. As a result, for the observer positioned on the front surface side of the light guide plate, the number of light sources visible through the prisms forming the sub-pattern differs for each sub-pattern. Accordingly, a degree of blurring differs for each sub-pattern allowing the display device to give a sense of depth to the displayed pattern.

According to a modification, the reflective surface of the prism 11 arranged to form the first sub-pattern 21-1 may also be formed so as to have a curved surface shape along the back surface 2b of the light guide plate 2. Also, each prism may simply be formed such that a curvature of the reflective surface of the prism 11 along the back surface 2b is different from a curvature of the reflective surface of the prisms 12 to 15, which are arranged to form the second sub-pattern 21-2, along the back surface 2b of the light guide plate 2. Since the display device according to the above described modification can also have a different degree of blurring for each sub-pattern included in the pattern, it is possible to give a sense of depth to a displayed pattern.

According to another modification, a reflective surface of a prism arranged to form any of the sub-patterns included in the pattern may be formed in a curved surface shape that is concave with respect to the incident surface 2a of the light guide plate 2, that is, with respect to the light sources 3-1 to 3-n. For example, for any of the sub-patterns, the prism 14 may be arranged such that the slope 14b of the prism 14 shown in FIGS. 7C and 7D is opposed to the light sources 3-1 to 3-n. Also, similar to the embodiment or the modifications described above, since the display device can also have a different degree of blurring for each sub-pattern included in the pattern, it is possible to give a sense of depth to a displayed pattern.

According to still another modification, the number of sub-patterns included in the pattern may be three or more. Also, each prism may simply be formed such that a curvature of a reflective surface of a prism forming a sub-pattern along the back surface of the light guide plate is different from one another for each sub-pattern.

According to yet another modification, some of the light sources 3-1 to 3-n may emit light of mutually different colors. In particular, it is preferable that, among the light sources 3-1 to 3-n, two or more mutually adjacent light source emit light of mutually different colors. Further, each prism 11 forming the first sub-pattern 21-1 is preferably arranged to face any of first light sources that emit light of the same color (for example, the light source 3-k shown in FIG. 6) among the light sources 3-1 to 3-n. Whereas, each prism 12 forming the second sub-pattern 21-2 is preferably arranged so as to reflect light from two or more light sources that emit light of mutually different colors among the light sources 3-1 to 3-n (that is, a first light source and a second light source, for example, the light source 3-p and the light source 3-q shown in FIG. 6) toward the same position on the front surface side of the light guide plate 2.

As described above, the number of light sources visible through a prism forming a sub-pattern differs for each sub-pattern. Therefore, for the observer positioned at a predetermined viewpoint on the front surface side of the light guide plate 2, for example, the first sub-pattern 21-1 appears to shine with an emission color of one light source having light reaching the viewpoint through the prism 11, among the light sources 3-1 to 3-n. Whereas, the second sub-pattern 21-2 appears to shine with an additively mixed color of respective emission colors of the two or more light sources having light reaching the viewpoint through the prism 12, among the light sources 3-1 to 3-n. Therefore, according to the present modification, the display device can make a difference in a color of a sub-pattern visible to the observer, for each sub-pattern. Further, a sub-pattern appearing to shine with an additively mixed color of emission colors of two or more light sources looks blurrier, which emphasizes a sense of depth of the pattern.

The display device according to one or more embodiments or one or more modifications described above may be mounted on a game machine such as a ball game machine or a rotary drum game machine.

Figure 9:
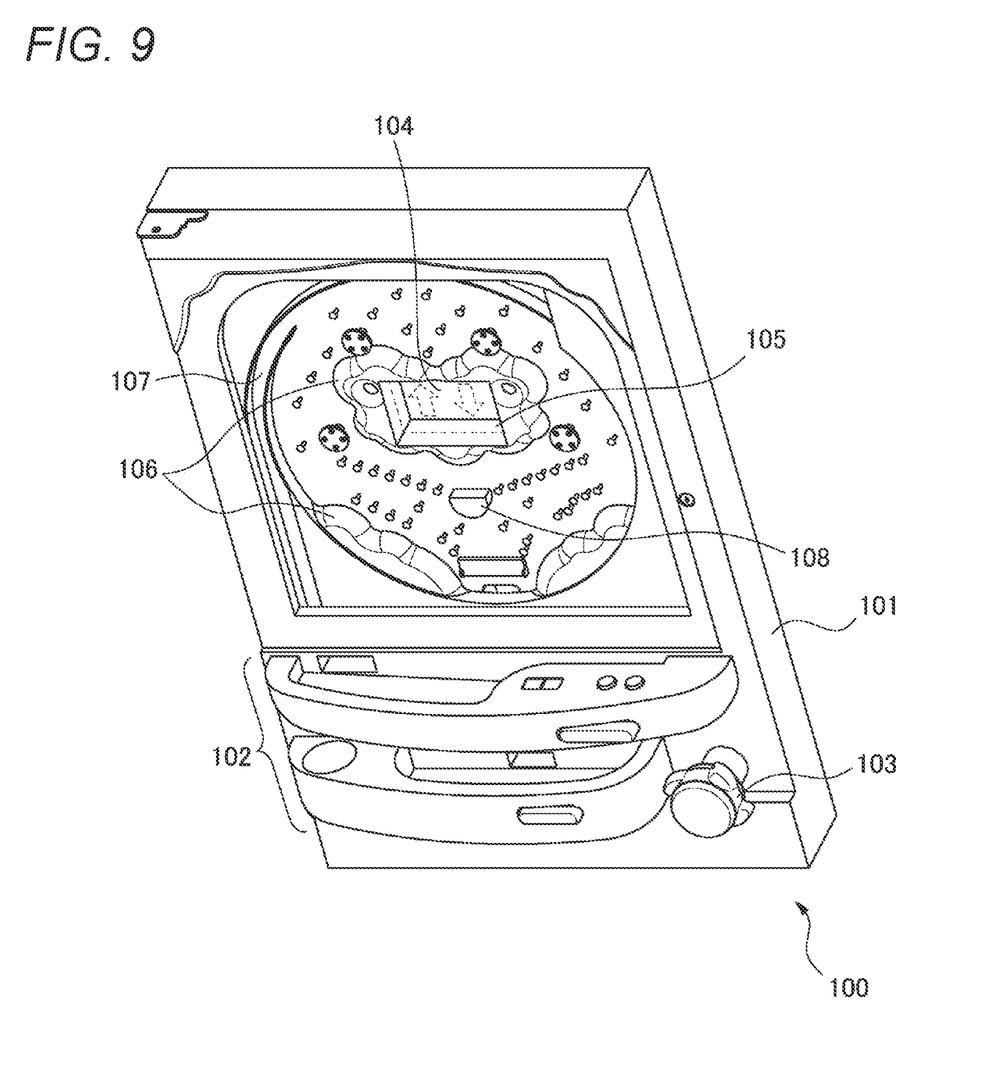
FIG. 9 is a schematic diagram illustrating a perspective view of a ball game machine having a display device according to one or more embodiments or one or more modifications.

FIG. 9 is a schematic perspective view of a ball game machine having the display device according to one or more embodiments or one or more modifications described above, when the ball game machine is viewed from a player side. As shown in FIG. 9, a ball game machine 100 includes: a game board 101 that is provided in most of an area from a top to a center and is a game machine main body; a ball receiving portion 102 arranged in a lower part of the game board 101; an operation unit 103 with a handle; a liquid crystal display 104 provided at a substantially center of the game board 101; and a display device 105 arranged on a front face of the liquid crystal display 104.

Further, the ball game machine 100 has an accessory 106 arranged in a lower part of the game board 101 or around the display device 105 on a front face of the game board 101, for the purpose of presentation of a game. Further, a rail 107 is arranged on a side of the game board 101. Further, on the game board 101, a large number of obstacle nails (not shown) and at least one winning device 108 are provided.

The operation unit 103 shoots a game ball with a predetermined force from a shooting device (not shown) in accordance with a rotation amount of the handle operated by a player. The shot game ball moves upward along the rail 107 and falls between the large number of obstacle nails. When a sensor (not shown) detects that the game ball has entered any of the winning devices 108, a main control circuit (not shown) provided on a back surface of the game board 101 discharges a predetermined number of game balls corresponding to the winning device 108 into which the game ball has entered, to the ball receiving portion 102 via a ball discharge device (not shown). Further, the main control circuit drives the liquid crystal display 104 and the display device 105 via a presentation CPU (not shown) provided on the back surface of the game board 101. The presentation CPU transmits a control signal including lighting control information according to a state of the game, to the display device 105.

The display device 105 is an example of the display device according to one or more embodiments or one or more modifications described above, and is attached to the game board 101 so that the outgoing surface of the light guide plate is directed toward the player. Further, the controller of the display device 105 allows the player to visually recognize a pattern together with a video image displayed on the liquid crystal display 104, by turning on each light source in accordance with the lighting control information included in the control signal from the presentation CPU. Alternatively, the controller may turn off all the light sources in accordance with the lighting control information, to allow the player to observe exclusively a video image displayed on the liquid crystal display 104 via the light guide plate.

As described above, those skilled in the art can make various changes within the scope of the invention according to one or more embodiments.

The invention claimed is:

1. A display device comprising:
   a transparent light guide plate comprising an incident edge surface, and an output surface; and
   a plurality of light sources facing the incident edge surface, the plurality of light sources being arranged along a longitudinal direction of the incident edge surface;
   a first sub-pattern formed on a surface of the light guide plate opposite the output surface, the first sub-pattern comprising at least one first prism having a first reflective surface configured to reflect light emitted from any of the plurality of light sources towards the output surface of the light guide plate, the first reflective surface having a first curvature; and
   a second sub-pattern formed on the surface of the light guide opposite the output surface, the second sub-pattern comprising at least one second prism having a second reflective surface configured to reflect light emitted from any of the plurality of light sources towards the output surface, the second reflective surface having a second curvature different from the first curvature,
   wherein the first and second sub-patterns form a main pattern, and wherein the first reflective surface of the first prism is planar on one side, and the second reflective surface is a convex curve on one side, and the plurality of light sources include a first light source and a second light source of different colors, which are arranged along the longitudinal direction of the incident edge surface, the first reflective surface of the first prism facing the first light source, and the second reflective surface of the second prism includes a first part facing the first light source and a second part facing the second light source and is arranged to direct light from each of the first light source and the second light source toward a same direction on the output surface by reflecting the light from the first light source on the first part and by reflecting the light from the second light source on the second part.

2. A game machine comprising:
   a game machine main body; and
   a display device provided on a surface on a side opposed to a player on the game machine main body, wherein the display device comprises:
      a transparent light guide plate comprising an incident edge surface, and an output surface; and
      a plurality of light sources facing the incident edge surface, the plurality of light sources being arranged along a longitudinal direction of the incident edge surface;
      a first sub-pattern formed on a surface of the light guide plate opposite the output surface, the first sub-pattern comprising at least one first prism having a first reflective surface configured to reflect light emitted from any of the plurality of light sources towards the output surface of the light guide plate, the first reflective surface having a first curvature; and
      a second sub-pattern formed on the surface of the light guide opposite the output surface, the second sub pattern comprising at least one second prism having a second reflective surface configured to reflect light emitted from any of the plurality of light sources towards the output surface, the second reflective surface having a second curvature different from the first curvature,
   wherein the first and second sub-patterns form a main pattern, and wherein the first reflective surface of the first prism is planar on one side, and the second reflective surface is a convex curve on one side, and the plurality of light sources include a first light source and a second light source of different colors, which are arranged along the longitudinal direction of the incident edge surface, the first reflective surface of the first prism facing the first light source, and the second reflective surface of the second prism includes a first part facing the first light source and a second part facing the second light source and is arranged to direct light from each of the first light source and the second light source toward a same direction on the output surface by reflecting the light from the first light source on the first part and by reflecting the light from the second light source on the second part.

\* \* \* \* \*